(12) United States Patent
Yun et al.

(10) Patent No.: US 11,177,519 B2
(45) Date of Patent: Nov. 16, 2021

(54) SECONDARY BATTERY (71) Applicant: LG Chem, Ltd., Seoul (KR)

(72) Inventors: Su Hyun Yun, Daejeon (KR); Kyoung Won Kang, Daejeon (KR); Ki Woong Kim, Daejeon (KR); Jung Shik Oh, Daejeon (KR)

(73) Assignee: LG Chem, Ltd.

( * ) Notice: Subject to any disclaimer, the term of this patent is extended or adjusted under 35 U.S.C. 154(b) by 224 days.

(21) Appl. No.: 16/332,978

(22) PCT Filed: May 4, 2018

(86) PCT No.: PCT/KR2018/005213
§ 371 (c)(1),
(2) Date: Mar. 13, 2019

(87) PCT Pub. No.: WO2019/009511
PCT Pub. Date: Jan. 10, 2019

(65) Prior Publication Data
US 2019/0273224 A1    Sep. 5, 2019

(30) Foreign Application Priority Data

Jul. 6, 2017 (KR) .................. 10-2017-0086050

(51) Int. Cl.
*H01M 50/10* (2021.01)
*H01M 4/02* (2006.01)
(Continued)

(52) U.S. Cl.
CPC ............. *H01M 50/10* (2021.01); *H01M 4/02* (2013.01); *H01M 4/66* (2013.01); *H01M 10/04* (2013.01);
(Continued)

(58) Field of Classification Search
CPC ............. H01M 10/04; H01M 10/0459; H01M 10/0583; H01M 10/42; H01M 2/02;
(Continued)

(56) References Cited

U.S. PATENT DOCUMENTS

2005/0123827 A1   6/2005  Kang et al.
2012/0114981 A1   5/2012  Cho et al.
(Continued)

FOREIGN PATENT DOCUMENTS

CN    104221201 A    12/2014
CN    104247141 A    12/2014
(Continued)

OTHER PUBLICATIONS

International Search Report for PCT/KR2018/005213 dated Aug. 10, 2018.
(Continued)

*Primary Examiner* — Adam A Arciero
(74) *Attorney, Agent, or Firm* — Lerner, David, Littenberg, Krumholz & Mentlik, LLP (57) ABSTRACT

A secondary battery comprises an electrode assembly comprising radical units in which first and second electrodes are alternately laminated with a separator therebetween and a separation film surrounding the radical units to be repeatedly laminated, wherein the electrode assembly comprises a protection unit laminated on an outermost separation film disposed on the uppermost end or lowermost end of the separation film, the protection unit has a structure comprising a second protection electrode, a separator, and a first protection electrode which are successively laminated from the outermost separation film disposed on the uppermost end or lowermost end of the electrode assembly, the second protection electrode has a cross-sectional coating structure comprising a second collector and a second electrode active
(Continued)

material portion coated with a second electrode active material on an inner surface of the second collector, and the inner surface is a surface facing a center of the electrode assembly.

15 Claims, 7 Drawing Sheets

(51) Int. Cl.
  *H01M 10/04* (2006.01)
  *H01M 10/0583* (2010.01)
  *H01M 10/42* (2006.01)
  *H01M 4/66* (2006.01)
  *H01M 50/572* (2021.01)

(52) U.S. Cl.
  CPC ... *H01M 10/0459* (2013.01); *H01M 10/0583* (2013.01); *H01M 10/42* (2013.01); *H01M 50/572* (2021.01)

(58) Field of Classification Search
  CPC ........ H01M 2/0202; H01M 2/34; H01M 4/02; H01M 4/66; Y02E 60/10
  See application file for complete search history.

(56) References Cited

U.S. PATENT DOCUMENTS

| | | | |
|---|---|---|---|
| 2014/0038032 A1 | 2/2014 | Lee et al. | |
| 2014/0072850 A1 | 3/2014 | Kwon et al. | |
| 2014/0099525 A1* | 4/2014 | Kwon | H01M 10/0431 429/94 |
| 2014/0363725 A1 | 12/2014 | Park et al. | |
| 2015/0024245 A1* | 1/2015 | Kwon | H01M 4/13 429/94 |
| 2016/0276702 A1 | 9/2016 | Nakai et al. | |
| 2016/0322618 A1 | 11/2016 | Jeong et al. | |
| 2017/0033407 A1 | 2/2017 | Kim et al. | |
| 2017/0207481 A1 | 7/2017 | Choi et al. | |

FOREIGN PATENT DOCUMENTS

| | | |
|---|---|---|
| CN | 105990598 A | 10/2016 |
| EP | 2840637 A1 | 2/2015 |
| EP | 3070776 A1 | 9/2016 |
| JP | 2002110170 A | 4/2002 |
| JP | 4432244 B2 | 3/2010 |
| JP | 2014110209 A | 6/2014 |
| JP | 5704373 B2 | 4/2015 |
| JP | 2015518257 A | 6/2015 |
| KR | 20050049208 A | 5/2005 |
| KR | 100958649 B1 | 5/2010 |
| KR | 20120040656 A | 4/2012 |
| KR | 20140017766 A | 2/2014 |
| KR | 20140103084 A | 8/2014 |
| KR | 20150081662 A | 7/2015 |
| KR | 20160019246 A | 2/2016 |
| KR | 20160039380 A | 4/2016 |
| KR | 20160050920 A | 5/2016 |
| KR | 20170021027 A | 2/2017 |
| KR | 20170022589 A | 3/2017 |
| KR | 20170053488 A | 5/2017 |

OTHER PUBLICATIONS

Supplementary European Search Report including Written Opinion for EP18828206.5 dated Oct. 14, 2019.
Search Report from Office Action for Chinese pplication No. 201880003697.4 dated Jun. 30, 2021; 2 pages.

* cited by examiner

SECONDARY BATTERY

CROSS-REFERENCE TO RELATED APPLICATION

The present application is a national phase entry under 35 U.S.C. § 317 of International Application No. PCT/KR2018/005213, filed on May 4, 2018, which claims priority from Korean Patent Application No. 10-2017-0086050, filed on Jul. 6, 2017, all of which are incorporated herein by reference in their entireties.

TECHNICAL FIELD

The present invention relates to a secondary battery, and more particularly, to a secondary battery in which short-circuit current generated while a nail passes therethrough is dispersed to secure safety.

BACKGROUND ART

In general, secondary batteries refer to chargeable and dischargeable batteries, unlike primary batteries that are not chargeable. Secondary batteries are being widely used in the high-tech electronic fields such as mobile phones, notebook computers, and camcorders.

Such a secondary battery is classified into a can-type secondary battery in which an electrode assembly is built in a metal can and a pouch-type secondary battery in which an electrode assembly is built in a pouch. The pouch-type secondary battery comprises an electrode assembly, an electrolyte, and a pouch accommodating the electrode assembly and the electrolyte. Also, the electrode assembly has a structure in which a plurality of electrodes and a plurality of separators are alternately laminated, and the plurality of electrodes comprise a positive electrode and a negative electrode.

However, when a nail passes through the above-described secondary battery, the positive electrode and the negative electrode may be short-circuited so that excessive short-circuit current flows, and thus, heat may be generated due to the short-circuit current to cause ignition and explosion.

DISCLOSURE OF THE INVENTION

Technical Problem

The present invention has been made to solve the above problem, and an object of the present invention is to provide a secondary battery, which disperses excessive short-current current generated when a nail passes therethrough to prevent ignition and explosion from occurring.

Technical Solution

To achieve the above-described object, a secondary battery according to a first embodiment of the present invention comprises an electrode assembly comprising a plurality of radical units in which a first electrode and a second electrode are alternately laminated with a separator therebetween and a separation film surrounding the plurality of radical units to be repeatedly laminated, wherein the electrode assembly comprises a protection unit laminated on an outermost separation film disposed on the uppermost end or lowermost end of the separation film, the protection unit has a structure comprising a second protection electrode, a separator, and a first protection electrode which are successively laminated from the outermost separation film disposed on the uppermost end or lowermost end of the electrode assembly, the second protection electrode has a cross-sectional coating structure comprising a second collector and a second electrode active material portion coated with a second electrode active material on an inner surface of the second collector, and the inner surface is a surface facing a center of the electrode assembly.

When a nail passes through the electrode assembly to cause short circuit of the electrode assembly, the protection unit may bypass short-circuit current to the second protection electrode connected to the nail to reduce an amount of heat.

The first protection electrode may comprise a first collector and a first electrode active material portion disposed on each of both surfaces of the first collector.

A secondary battery according to a second embodiment of the present invention comprises an electrode assembly comprising a plurality of radical units in which a first electrode and a second electrode are alternately laminated with a separator therebetween and a separation film surrounding the plurality of radical units to be repeatedly laminated, wherein the electrode assembly comprises a protection unit laminated on an outermost separation film disposed on the uppermost end or lowermost end of the separation film, the protection unit has a structure comprising a first protection electrode, a separator, and a second protection electrode which are successively laminated from the outermost separation film disposed on the uppermost end or lowermost end of the electrode assembly, the second protection electrode has a cross-sectional coating structure comprising a second collector and a second electrode active material portion coated with a second electrode active material on an inner surface of the second collector, wherein the inner surface is a surface facing a center of the electrode assembly, and the first protection electrode has a cross-sectional coating structure comprising a first collector and a first electrode active material portion coated with a first active material on an inner surface of the first collector, wherein the inner surface of the first collector is a surface facing a center of the electrode assembly.

When a nail passes through the electrode assembly to cause short circuit of the electrode assembly, the protection unit may bypass short-circuit current to the second protection electrode and the first protection electrode, which respectively have the cross-sectional coating structures connected to the nail, to reduce an amount of heat.

Each of the plurality of radical units may be provided as a bicell having both ends on which electrodes having the same polarity are disposed, and a first electrode may be disposed on each of both the ends of the bicell disposed on each of the uppermost end and lowermost end of the electrode assembly.

The second collector may be made of one metal of Cu, Al, Ni, Fe, and Pb.

The second collector may be made of an Al metal, and the first collector may be made of a Cu metal.

Each of the first electrode and the first protection electrode may be a negative electrode, and each of the second electrode and the second protection electrode may be a positive electrode.

The secondary battery may further comprise a protection film surrounding the protection unit laminated on the uppermost end or lowermost end of the electrode assembly.

The second collector provided in the second protection electrode may have a thickness greater than that of the second collector provided in the second electrode of the radical unit.

The protection unit may not be coupled to the outermost separation film of the electrode assembly or may be coupled to the outermost separation film with a coupling force that is less than that between the first electrode and the separator or between the second electrode and the separator.

The secondary battery may further comprise a case accommodating the electrode assembly on which the protection unit is laminated, wherein the electrode assembly may be accommodated in the case in a state in which the protection unit faces an inner surface of the case.

The protection film may surround the protection unit laminated on the uppermost end or lowermost end of the electrode assembly in a state in which the protection film is integrally connected to a distal end of the separation film.

Advantageous Effects

The present invention has effects as follows.

First: the secondary battery according to the present invention may comprise the protection unit comprising the first protection electrode, the separator, and the second protection electrode. The second protection electrode may have the cross-sectional coating structure in which only one surface is coated with the electrode active material. Thus, when the short-circuit of the electrode assembly occurs by the penetration of the nail, the short-circuit current may be bypassed to the second protection electrode connected through the nail. That is, the short-circuit current may be dispersed to the second protection electrode. Thus, heat generated by the short-circuit current may be significantly reduced, and also, ignition and explosion may be prevented to significantly secure stability.

Second: in the protection unit of the secondary battery according to the present invention, the first protection electrode may have the structure in which both surfaces are coated with the electrode active material. Thus, the protection unit may be improved in strength. In addition, the first electrode provided in the secondary battery may be used as the first protection electrode to improve the convenience and efficiency of use.

Third: in the protection unit of the secondary battery according to the present invention, the first protection electrode may have the structure in which only one surface is coated with the electrode active material. Thus, the short-circuit current generated when the short-circuit of the secondary battery occurs due to the penetration of the nail may be bypassed to the first and second protection electrodes through the nail at the same time. That is, the short-circuit current may be dispersed to the first and second protection electrodes. Thus, the amount of heat generated by the short-circuit current may be significantly reduced, and also, ignition and explosion may be prevented to significantly secure stability.

Fourth: in the radical unit of the secondary battery according to the present invention, the electrodes having the same polarity may be provided as bicells disposed on both the ends. Thus, the plurality of radical units may be laminated in the first direction to sufficiently secure the capacity of the battery.

Fifth: in the protection unit of the secondary battery according to the present invention, the second collector of the second protection electrode may be made of Al, and the first collector of the first protection electrode may be made of Cu. Thus, the short-circuit current may be more stably bypassed to reduce the amount of heat.

Sixth: the protection unit of the secondary battery according to the present invention may be protected by the protection film connected to the end of the separation film. Thus, the protection unit may be protected against external impact, and a stable fixing force may be obtained.

Seventh: in the protection unit of the secondary battery according to the present invention, the second collector of the second protection electrode may have a thickness greater than that of the second collector provided in the radical unit. Thus, the short-circuit current may be more stably bypassed to prevent ignition and explosion from occurring.

Eighth: the protection unit of the secondary battery according to the present invention may not be coupled to the outermost separation film or may be weakly coupled to the outermost separation film. Thus, the outermost separation film may be easily separated from the protection unit.

Ninth: in the secondary battery according to the present invention, the electrode assembly in which the protection units are laminated may be accommodated in the case. Here, the protection units may be accommodated to face the inner surface of the case. Thus, the nail passing through the case may pass through the protection units, thereby stably bypassing the short-circuit current.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery According to First Embodiment of the Present Invention

Figure 1:
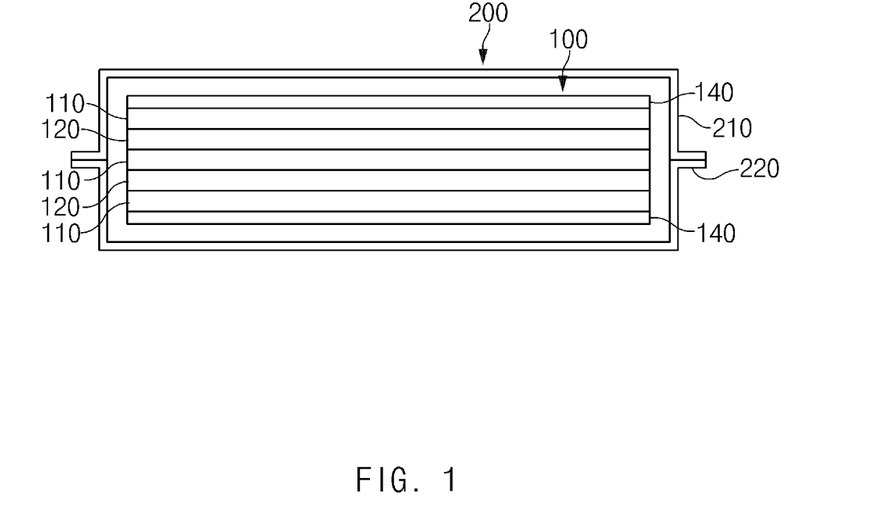
FIG. 1 is a cross-sectional view of a secondary battery according to a first embodiment of the present invention.

As illustrated in FIG. 1, a second battery according to a first embodiment of the present invention comprises an electrode assembly 100, an electrolyte (not shown), and a case 200 in which the electrode assembly 100 and the electrolyte are accommodated.

Electrode Assembly

Figure 2:
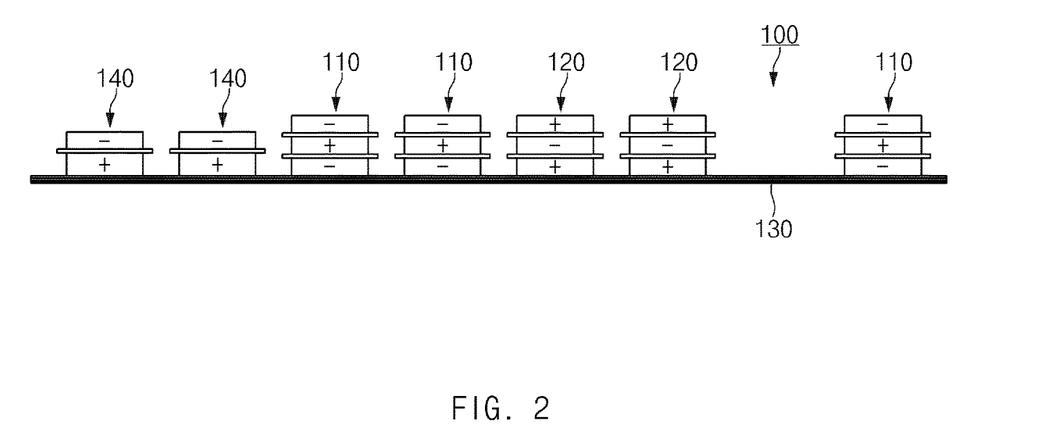
FIG. 2 is a view illustrating a state of an electrode assembly before being laminated according to the first embodiment of the present invention.
Figure 3:
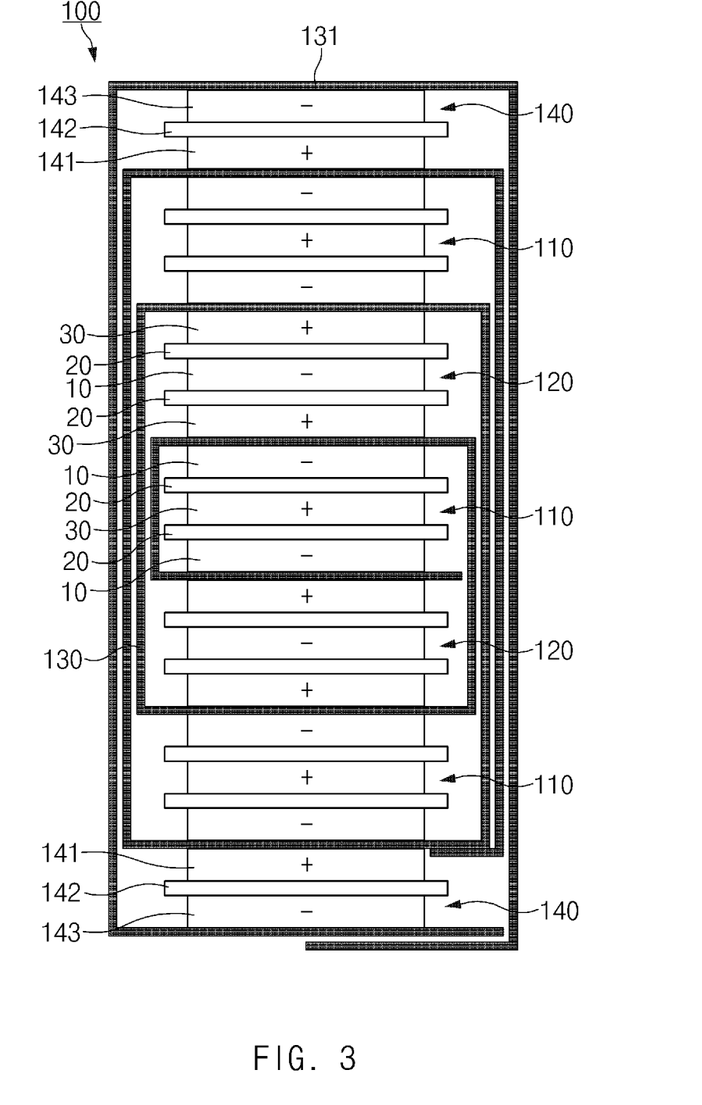
FIG. 3 is a view illustrating a state of the electrode assembly after being laminated according to the first embodiment of the present invention.

As illustrated in FIGS. 2 and 3, the electrode assembly 100 comprises a plurality of radical units in which a first electrode and a second electrode are alternately laminated with a separator therebetween, and a separation film 130 surrounds the plurality of radical units to be repeatedly laminated.

The plurality of radical units may be provided as bicells, each of which has two ends on which electrodes having the same polarity are disposed. The first electrode is disposed on each of both ends of the bicells disposed on the uppermost and lower most ends of the electrode assembly 100. For example, the plurality of radical units comprise a first bicell 110 and a second bicell 120. The first bicell 110 has a five-layer structure in which the first electrode 10, the separator 20, the second electrode 30, the separator 20, and the first electrode 10 are successively laminated, and the second bicell 120 has a five-layer structure in which the second electrode 30, the separator 20, the first electrode 10, the separator 20, and the second electrode 30 are successively laminated.

As described above, the electrode assembly 100 is formed by alternately laminating the first bicell 110 and the second bicell 120. The first bicell 110 is laminated on the outermost portions (the uppermost end and the lowermost end) of the electrode assembly 100.

The separation film 130 is disposed between the first bicell 110 and the second bicell 120 and has a long sheet shape. The first bicell 110 and the second bicell 120 are alternately laminated on a top surface of the separation film. For example, referring to FIG. 2, in the separation film 130, the first bicell 110, the first bicell 110, the second bicell 120, the second bicell 120, and the first bicell 110 are successively disposed from the left side to the right side. Also, when the separation film 130 is wound from the right side to the left side, as illustrated in FIG. 3, the first bicell 110, the second bicell 120, the first bicell 110, the second bicell 120, and the first bicell 110 are successively laminated in a state in which the separation film 130 is disposed therebetween to manufacture the electrode assembly 100. Here, a distal end of the separation film may be wound on the outside of the electrode assembly 100, in which the bicells are laminated, at least once to protect the electrode assembly 100.

Here, the first electrode 10 may be a negative electrode, and the second electrode 30 may be a positive electrode.

Case

The case 200 sealably accommodates the electrode assembly and the electrolyte. The case 200 comprises an accommodation part 210 accommodating the electrode assembly 100 and the electrolyte and a sealing part 220 sealably sealing the accommodation part 210.

The secondary battery according to the first embodiment of the present invention comprises a protection unit 140 that bypasses, i.e., disperses short-circuit current generated when a nail passes through the electrode assembly to reduce an amount of heat, thereby preventing ignition or explosion from occurring, resulting in securing safety.

Protection Unit

As illustrated in FIG. 3, the protection unit 140 has a structure in which the protection unit 140 is laminated on the outermost separation film 130 disposed on the uppermost end or the lowermost end of the electrode assembly 100, and the second protection electrode 141, the separator 142, and the first protection electrode 143 are successively laminated from the outermost separation film 130 disposed on the uppermost end or the lowermost end of the electrode assembly 100.

The second protection electrode has a cross-sectional coating structure. For example, the second protection electrode 141 comprises a second collector 141a and a second electrode active material portion 141b coated with a second electrode active material on an inner surface of the second collector 141a. The inner surface of the second collector 141a may be a surface facing a center of the electrode assembly 100. A non-coating portion, which is not coated with the second electrode active material, is formed on an outer surface of the second collector 141a.

As described above, as illustrated in FIGS. 4 and 5, in the second protection electrode 141, the second electrode active material portion 141b coated on the inner surface of the second collector 141a and the first electrode 10 of the first bicell 110 coming into contact with the outermost separation film 130 may interact with each other to increase a battery capacity. In addition, when a nail 1 passes through the electrode assembly 100 to cause short circuit of the electrode assembly 100, short-circuit current may be bypassed to the second protection electrode 141 connected to the nail 1, i.e., the entire non-coating portion formed on the outer surface of the second collector 141a of the second protection electrode to reduce an amount of heat, thereby preventing ignition and explosion from occurring due to a decrease in temperature of the electrode assembly 100, resulting in significantly securing safety of the secondary battery.

Figure 4:
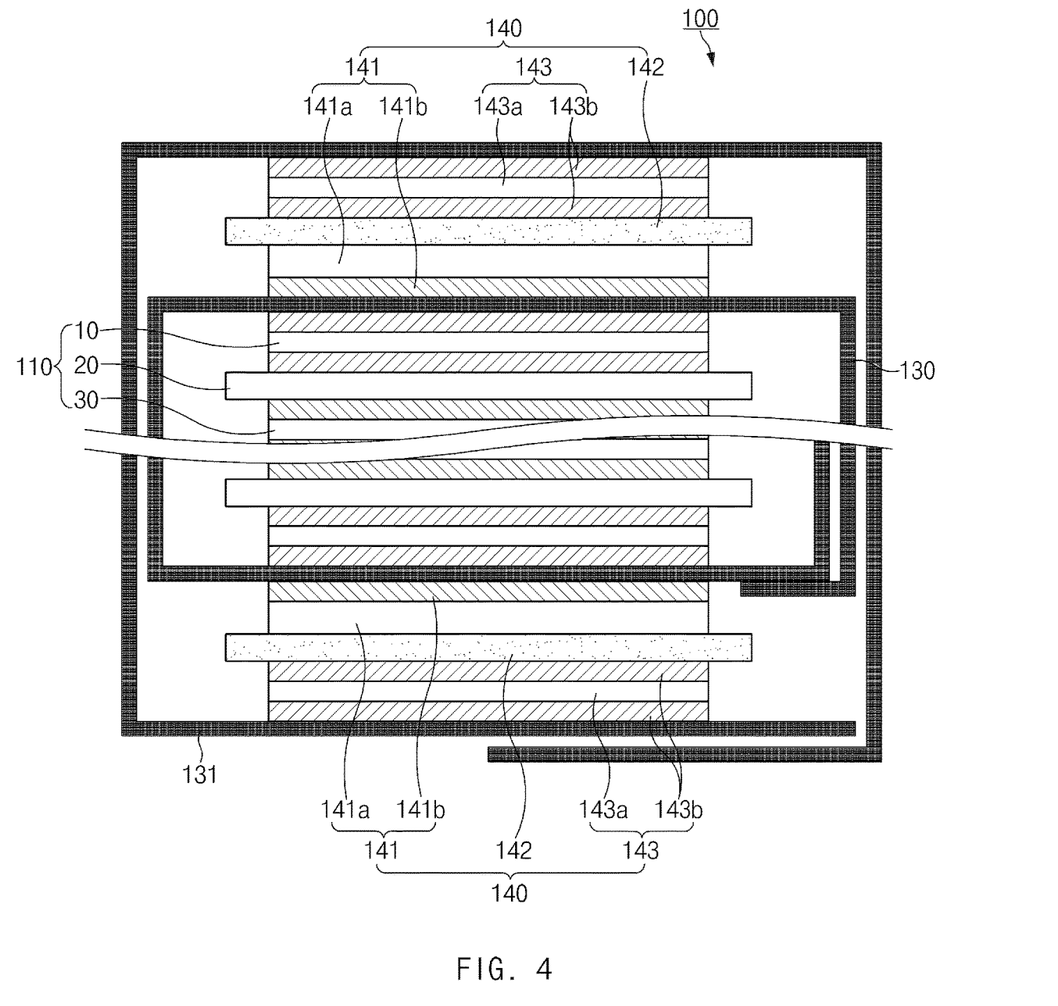
FIG. 4 is an enlarged cross-sectional view illustrating a protection unit of the electrode assembly according to the first embodiment of the present invention.
Figure 5:
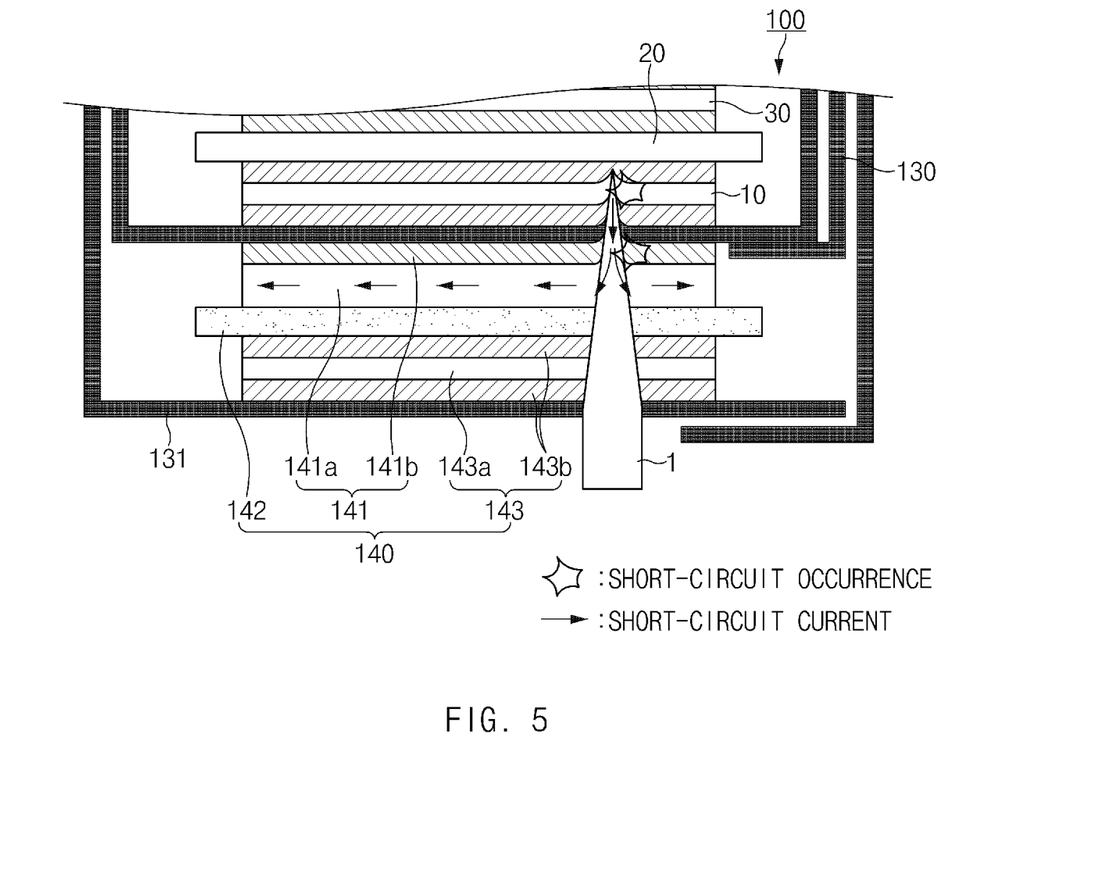
FIG. 5 is a cross-sectional view illustrating a state in which a nail passes through the electrode assembly according to the first embodiment of the present invention.

The first protection electrode 143 is configured to protect the second protection electrode 141 and comprises a first collector 143a and a first electrode active material portion 143b disposed on each of both surfaces of the first collector 143a.

Here, the first protection electrode 143 may be a negative electrode, and the second protection electrode 141 may be a positive electrode.

The second collector 141a may be configured to stably disperse the short-circuit current and be made of one metal of Cu, Al, Ni, Fe, and Pb. Particularly, the second collector 141a may be made of an Al metal that is capable of greatly improving the dispersion of the short-circuit current.

The first collector 143a may be made of a Cu metal to more stably protect the second protection electrode 141.

In order to protect the protection unit 140 laminated on the uppermost end or lowermost end of the electrode assembly 100, the protection film 131 may be provided. The protection film 131 surrounds the electrode assembly at least once in a state of comprising the protection unit 140 laminated on the uppermost end or lowermost end of the electrode assembly 100. Here, the protection film 131 and the separation film 130 may be made of the same material.

The protection unit 140 may not be coupled to the outermost separation film 130 of the electrode assembly 100 or may be coupled to the outermost separation film 130 with a coupling force that is less than that between the first electrode 10 and the separator 20 or between the second electrode 30 and the separator 20.

That is, the protection unit 140 may be easily separated from the outermost separation film 130 due to adhesion between the radical unit and the protection unit 140. Here, delamination of the electrode of the radical unit and the separator may be prevented by the adhesion between the radical unit and the protection unit 140.

When the electrode assembly 100 is accommodated in the case 200, the electrode assembly 100 comprising the protection unit 140 is accommodated in the case 200 in a state in which the protection unit 140 faces an inner surface of the case 200 (for example, faces an inner top or bottom surface when viewed in FIG. 1). That is, the protection unit 140 is disposed to face a portion at which the possibility of nail penetration is likely to occur.

Thus, the secondary battery according to the first embodiment of the present invention may comprise the electrode assembly 100 comprising the protection unit 140 to more effectively disperse the short-circuit current generated when the nail passes through the electrode assembly 100, and thus, the amount of heat of the electrode assembly 100 may be greatly reduced to prevent ignition or explosion from occurring, thereby securing safety.

Hereinafter, in descriptions of another embodiment of the present invention, constituents having the same configuration and function as the abovementioned embodiment have been given the same reference numeral in the drawings, and thus duplicated description will be omitted.

Secondary Battery According to Second Embodiment of the Present Invention

Figure 6:
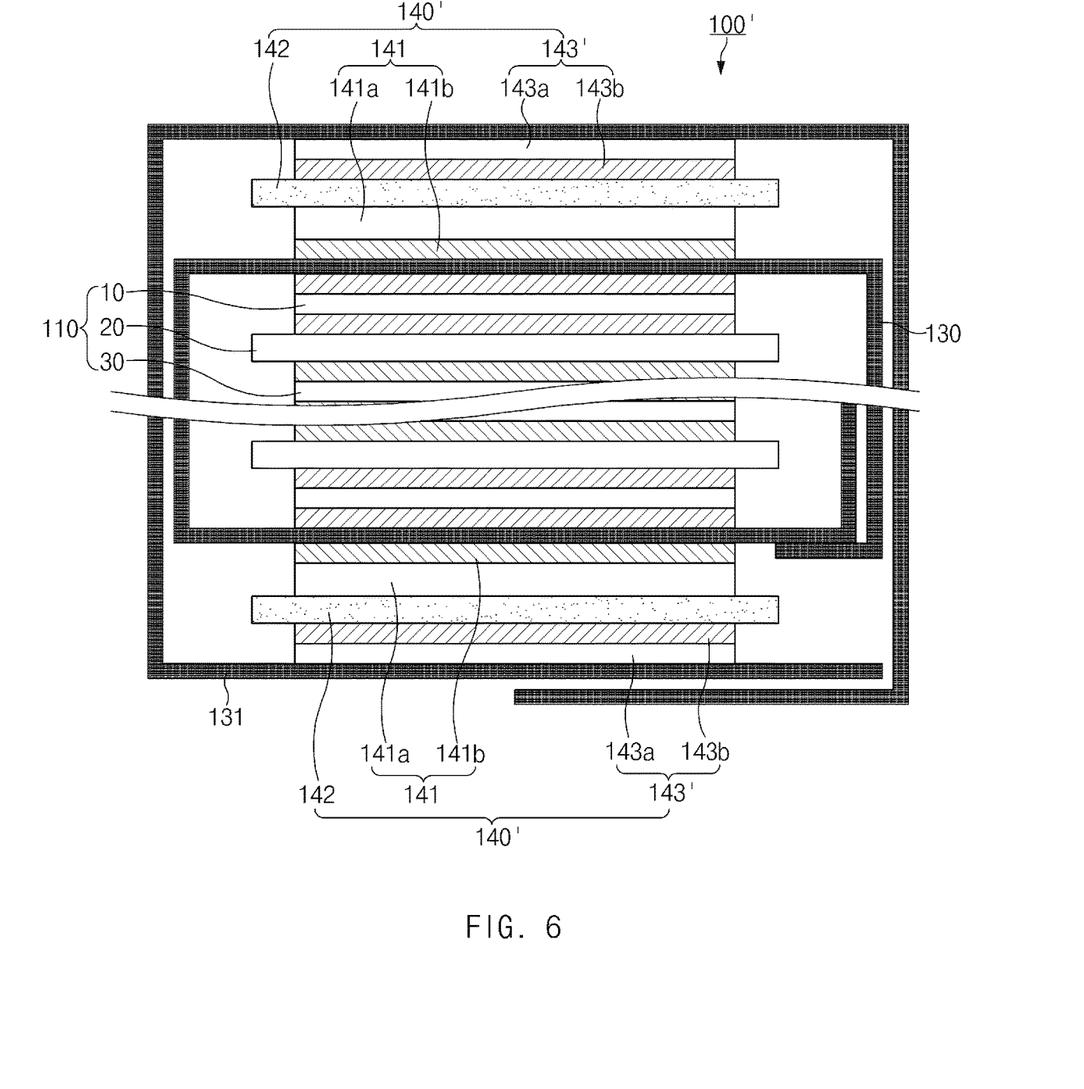
FIG. 6 is a cross-sectional view of an electrode assembly according to a second embodiment of the present invention.

As illustrated in FIG. 6, a secondary battery according to a second embodiment of the present invention comprises an electrode assembly 100'. The electrode assembly 100' comprises a plurality of radical units in which a first electrode and a second electrode are alternately laminated with a separator therebetween and a separation film 130 surrounds the plurality of radical units to be repeatedly laminated.

The plurality of radical units may be provided as bicells, each of which has two ends on which electrodes having the same polarity are disposed. The first electrode is disposed on each of both the ends of the bicells disposed on the uppermost and lower most ends of the electrode assembly 100. That is, the plurality of radical units comprise a first bicell 110 and a second bicell 120 (not shown in FIG. 6).

Here, the plurality of radical units may have the same constituents and functionality as the plurality of radical units according to the first embodiment, and thus, their duplicated description will be omitted.

The secondary battery according to the second embodiment of the present invention comprises a protection unit 140' that bypasses, i.e., disperses short-circuit current generated when a nail passes through the electrode assembly 100' to reduce an amount of heat, thereby preventing ignition or explosion from occurring, resulting in securing safety. The protection unit 140' has a structure in which the protection unit 140' is laminated on the outermost separation film 130 disposed on the uppermost end or the lowermost end of the electrode assembly 100', and a second protection electrode 141, a separator 142, and a first protection electrode 143' are successively laminated from the outermost separation film 130 disposed on the uppermost end or the lowermost end of the electrode assembly 100'.

The second protection electrode 141 comprises a second collector 141*a* and a second electrode active material portion 141*b* coated with a second electrode active material on an inner surface of the second collector 141*a*. The inner surface of the second collector 141*a* may be a surface facing a center of the electrode assembly 100'.

The first protection electrode 143' has a cross-sectional coating structure comprising a second collector 143*a* and a first electrode active material portion 143*b* coated with a first electrode active material on an inner surface of the first collector 143*a*. The inner surface of the first collector 143*a* may be a surface facing the center of the electrode assembly 100'.

The protection unit 140' having the above-described configuration may have the cross-sectional coating structure in which the electrode active material is applied to only one surface of each of the first and second protection electrodes 143' and 141. Thus, when short circuit of the electrode assembly 100' occurs due to nail penetration, short-circuit current may be bypassed to the first and second protection electrodes 143' and 141 connected to the nail, more particularly, the first and second collectors 143*a* and 141*a*, to significantly reduce the amount of heat, thereby significantly reducing temperature of the electrode assembly 100' and thereby preventing ignition or explosion from occurring.

Thus, the secondary battery according to the second embodiment of the present invention may be provided with the electrode assembly 100' comprising the protection unit 140'. Here, each of the first and second protection electrodes 143' and 141 of the protection unit 140' may have the cross-sectional coating structure on which the electrode active material is applied to only one surface thereof to significantly secure safety of the secondary battery.

Secondary Battery According to Third Embodiment of the Present Invention

Figure 7:
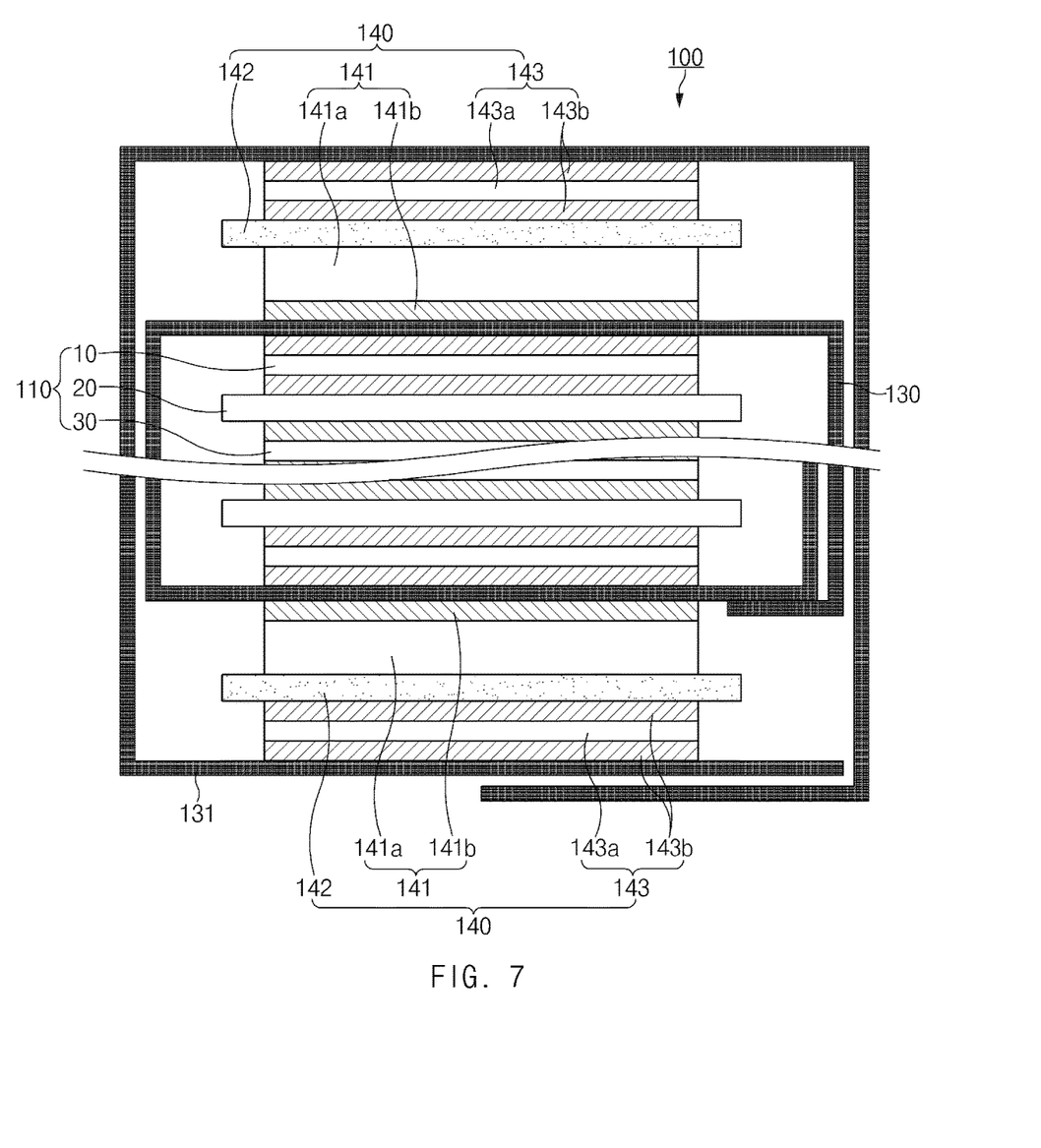
FIG. 7 is a cross-sectional view of an electrode assembly according to a third embodiment of the present invention.

As illustrated in FIG. 7, a secondary battery according to a third embodiment of the present invention comprises a second collector 141*a* of a second protection electrode 141. The second collector 141*a* has a thickness greater than that of the second collector provided in the second electrode 30 of the radical unit. Thus, an area of the second collector 141*a* provided in the second protection electrode 141 may be largely secured to improve dispersion of short-circuit current, thereby more significantly securing safety of the secondary battery.

Secondary Battery According to Fourth Embodiment of the Present Invention

In a secondary battery according to a fourth embodiment of the present invention, two or more protection units 140, each of which is laminated on the outermost separation film 130 disposed on the uppermost end or lowermost end of an electrode assembly 100, may be continuously laminated. That is, two or more protection units 140 may be continuously laminated on the outermost separation film 130 to secure safety due to penetration of a nail.

Secondary Battery According to Fifth Embodiment of the Present Invention

In a secondary battery according to a fifth embodiment of the present invention, a protection film 131 surrounds a protection unit 140 laminated on the uppermost end or lowermost end of an electrode assembly 100 in a state in which the protection film 131 is integrally connected to a distal end of the outermost separation film 130.

That is, as illustrated in FIG. 2, in a secondary battery according to a fifth embodiment of the present invention, two protection units 140 and a plurality of radical units may be disposed on a top surface of a separation film 130 to which a protection film is integrally connected, and then, the separation film 130 may be wound to manufacture a secondary battery 100 on which the protection unit 140 is disposed on the uppermost end or lowermost end thereof.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
an electrode assembly comprising a plurality of bicell radical units having two ends on which electrodes having the same polarity are disposed and a separation film surrounding the plurality of radical units to be repeatedly laminated,
wherein the electrode assembly comprises a protection unit laminated on an outermost separation film disposed on the uppermost end or lowermost end of the separation film,
the protection unit having a monocell structure comprising a second protection electrode, a separator, and a first protection electrode which are successively laminated from the outermost separation film disposed on the uppermost end or lowermost end of the electrode assembly, and a protection film surrounding and laminated on the monocell structure, the protection unit being configured to be separated from the outermost separation film due to a first coupling force between the monocell structure and the outermost separation film being less than a second coupling force between the monocell structure and the protection film,
the second protection electrode has a cross-sectional coating structure comprising a second collector and a second electrode active material portion coated with a second electrode active material on only one inner surface of the second protection electrode and a non-coating portion on an outer surface of the second collector that is not coated with the second electrode active material, and
the inner surface is a surface facing a center of the electrode assembly,
wherein the first protection electrode comprises a first collector and a first electrode active material portion disposed on each of two surfaces of the first collector.

2. The secondary battery of claim 1, wherein, when a nail passes through the electrode assembly to cause a short circuit of the electrode assembly, the protection unit bypasses short-circuit current to the second protection electrode connected to the nail to reduce an amount of heat.

3. The secondary battery of claim 1, wherein a first electrode is disposed on each of both ends of the bicell disposed on each of the uppermost end and lowermost end of the electrode assembly.

4. The secondary battery of claim 1, wherein the second collector is made of one metal of Cu, Al, Ni, Fe, and Pb.

5. The secondary battery of claim 1, wherein each of the first electrode and the first protection electrode is a negative electrode, and each of the second electrode and the second protection electrode is a positive electrode.

6. The secondary battery of claim 1, wherein the second collector provided in the second protection electrode has a thickness greater than that of the second collector provided in the second electrode of the radical unit.

7. The secondary battery of claim 1, further comprising a case accommodating the electrode assembly on which the protection unit is laminated,
wherein the electrode assembly is accommodated in the case in a state in which the protection unit faces an inner surface of the case.

8. The secondary battery of claim 6, wherein the protection film surrounds the protection unit laminated on the uppermost end or lowermost end of the electrode assembly in a state in which the protection film is integrally connected to a distal end of the separation film.

9. A secondary battery comprising:
an electrode assembly comprising a plurality of bicell radical units having two ends on which electrodes having the same polarity are disposed and a separation film surrounding the plurality of radical units to be repeatedly laminated,
wherein the electrode assembly comprises a protection unit laminated on an outermost separation film disposed on the uppermost end or lowermost end of the separation film,
the protection unit having a monocell structure comprising a first protection electrode, a separator, and a second protection electrode which are successively laminated from the outermost separation film disposed on the uppermost end or lowermost end of the electrode assembly, and a protection film surrounding and laminated on the monocell structure, the protection unit being configured to be separated from the outermost separation film due to a first coupling force between the monocell structure and the outermost separation film being less than a second coupling force between the monocell structure and the protection film,
the second protection electrode has a cross-sectional coating structure comprising a second collector and a second electrode active material portion coated with a second electrode active material on only one inner surface of the second protection electrode and a non-coating portion on an outer surface of the second collector that is not coated with the second electrode active material, wherein the inner surface is a surface facing a center of the electrode assembly, and
the first protection electrode has a cross-sectional coating structure comprising a first collector and a first electrode active material portion coated with a first active material on an inner surface of the first collector and a non-coating portion on an outer surface of the first collector that is not coated with the first electrode active material, wherein the inner surface of the first collector is a surface of the center of the electrode assembly.

10. The secondary battery of claim 9, wherein, when a nail passes through the electrode assembly to cause a short circuit of the electrode assembly, the protection unit bypasses short-circuit current to the second protection electrode and the first protection electrode, which respectively have the cross-sectional coating structures connected to the nail, to reduce an amount of heat.

11. The secondary battery of claim 9, wherein the first collector is made of a Cu metal.

12. The secondary battery of claim 9, wherein a first electrode is disposed on each of both ends of the bicell disposed on each of the uppermost end and lowermost end of the electrode assembly.

13. The secondary battery of claim 9, wherein each of the first electrode and the first protection electrode is a negative electrode, and each of the second electrode and the second protection electrode is a positive electrode.

14. The secondary battery of claim 9, wherein the second collector provided in the second protection electrode has a thickness greater than that of the second collector provided in the second electrode of the radical unit.

15. The secondary battery of claim 9, further comprising a case accommodating the electrode assembly on which the protection unit is laminated, wherein the electrode assembly is accommodated in the case in a state in which the protection unit faces an inner surface of the case.

* * * * *